United States Patent [19]

Fukamachi et al.

[11] Patent Number: 4,506,216
[45] Date of Patent: Mar. 19, 1985

[54] SPEED METER SYSTEM FOR VEHICLE

[75] Inventors: Masaaki Fukamachi; Masahiko Sueyoshi, both of Miyazaki, Japan

[73] Assignee: Honda Giken Kogyo Kabushiki Kaisha, Tokyo, Japan

[21] Appl. No.: 387,557

[22] Filed: Jun. 11, 1982

[30] Foreign Application Priority Data

Jun. 16, 1981 [JP] Japan .................................. 56-91577

[51] Int. Cl.$^3$ ............................................. G01P 3/489
[52] U.S. Cl. ..................................... 324/166; 324/161
[58] Field of Search ............... 324/166, 161, 167, 168, 324/169; 318/603, 685, 698; 340/670, 671

[56] References Cited

U.S. PATENT DOCUMENTS 4,227,150 10/1980 Widl .
4,430,612 2/1984 Onitsuka .............................. 324/166

Primary Examiner—Stanley T. Krawczewicz
Assistant Examiner—Jose M. Solis
Attorney, Agent, or Firm—Armstrong, Nikaido, Marmelstein & Kubovcik

[57] ABSTRACT

A speed meter system for a vehicle which comprises a first pulse generator for providing pulses in accordance with the speed or engine speed of a vehicle, a first counter which is coupled to the first pulse generator for counting the number of pulses generated by the pulse generator, a second counter and a comparator coupled to the first and second counters for comparing the counts therein, the comparator producing a first judgement signal indicative of whether the count of the first counter is larger than or smaller than the count of the second counter and a second judgement signal indicative of the equality or inequality of the counts in the first and second counts. A gate circuit is coupled to the comparator for receiving the second judgement signal therefrom, the gate being opened when the second judgement signal indicates an inequality and closed when the second judgement signal indicates equality. A second pulse generator is coupled to the second counter means through the gate circuit for applying pulses to the second counter when the gate circuit is open, thereby changing the count in the second counter and an output is coupled to the second pulse generator through the gate circuit for providing an output indicative of the speed of the vehicle or engine thereof in accordance with the output of the second pulse generator.

4 Claims, 2 Drawing Figures

SPEED METER SYSTEM FOR VEHICLE

BACKGROUND OF THE INVENTION

1. Field of the Invention

This invention relates to a speed meter system for a vehicle, and more particularly, to a speed meter system which eliminates problems resulting from accumulated errors.

2. Description of the Prior Art

In prior art vehicle speed meter systems as shown in FIG. 1, for example, a pulse signal, generated by a pulse signal generating means a, corresponding to a vehicle speed is counted a predetermined period of time by a first counter b, and then the counted value thereof is applied to a second counter c. The number of pulse signals according to a vehicle speed is then counted for a subsequent current predetermined period of time by the first counter b, and then, the counts in counters a and b are compared in comparator d and a judgement signal indicating which of the counted signals is larger, is generated as a pulse difference signal by the comparator d. During the next predetermined period of time, that is, during the time that a new pulse signal corresponding to a vehicle speed is being counted by the first and second counters b, c, the comparison signal generated at the comparator d is applied to a memory e, and a standard pulse signal corresponding to the signal applied to memory e is generated from the memory e and applied to a pulse motor f to cause the motor to turn in a forward direction or a reverse direction, so that a pointer of an indication meter g coupled to the motor f indicates the measured value.

This conventional speed meter, however, is so arranged that the movement of the pointer of the speed meter g corresponds to a resultant value obtained by subtraction between the counted value of the first counter b and the counted value of the second counter c. Therefore, it has the disadvantage that if there is an error in counting by either of the two counters b or c, this error cannot be eliminated and remains in the counters b and c, and thus, at each time when an error is generated, the errors are accumulated in the resultant counted value.

Additionally, since the prior art speed meter system uses the pulse difference signal as the output of the comparator d, a large number of connecting lines, corresponding to the number of pulses, are required for connections between the comparator d and the memory e. This results in the disadvantage that the system has a high frequency of trouble and is expensive.

SUMMARY OF THE INVENTION

It is an object of the present invention to provide a speed meter system which eliminates the accumulation of errors.

It is a further object of the present invention to provide a speed meter system which reduces the number of connecting lines between components.

The present invention is directed to a speed meter system which comprises a first counter which counts, for a predetermined period of time, a pulse signal corresponding to a vehicle speed or an engine speed, a second counter, and a comparator circuit which compares the counted value of the first counter and the counted value of the second counter and generates a first judgement signal in accordance with whether the count of the first counter is larger or smaller than the count of the second counter and a second judgement signal in accordance with the equality or inequality of the two counted values. A gate circuit is coupled to the comparator circuit and opens when there is any difference between the two counted values. The second counter adds or subtracts to the previously held counted value thereof, a standard pulse signal applied thereto through the gate circuit when the gate circuit is in an open condition, according to the first judgement signal of the comparator circuit, so that the counted value thereof is varied one by one until the resultant counted value thereof becomes equal to the counted value of the first counter. A distribution circuit distributes a standard pulse signal inputted thereto through the opened gate circuit to plural poles of a pulse motor in sequence in the positive direction or the negative direction according to the first judgement signal of the comparator circuit. An indication meter is provided which uses the pulse motor as a driving source, the meter having a pointer which is turned in either direction by a regular turning or a reverse turning of the pulse motor, for indicating the vehicle speed or the engine speed.

DETAILED DESCRIPTION OF THE PREFERRED EMBODIMENT

Figure 1:
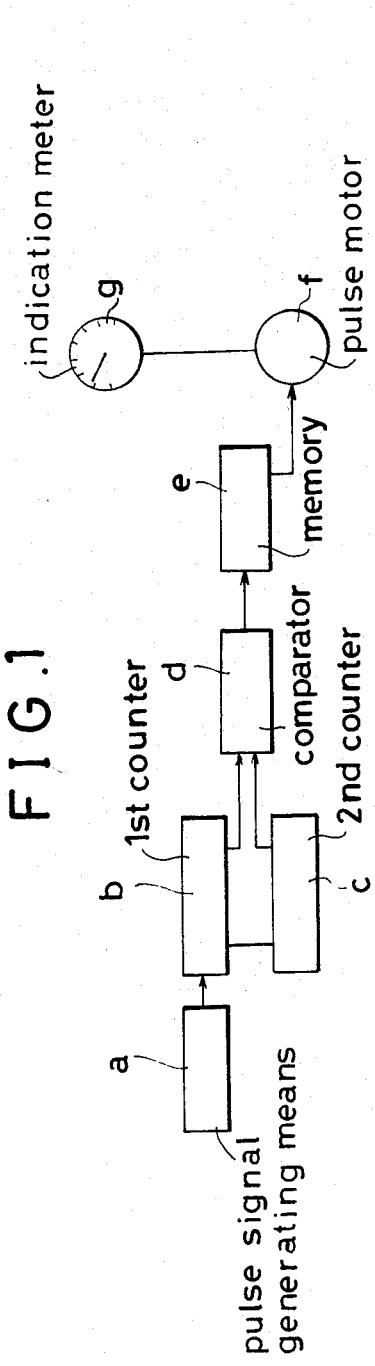
FIG. 1 is a schematic diagram of a prior art speed meter system.
Figure 2:
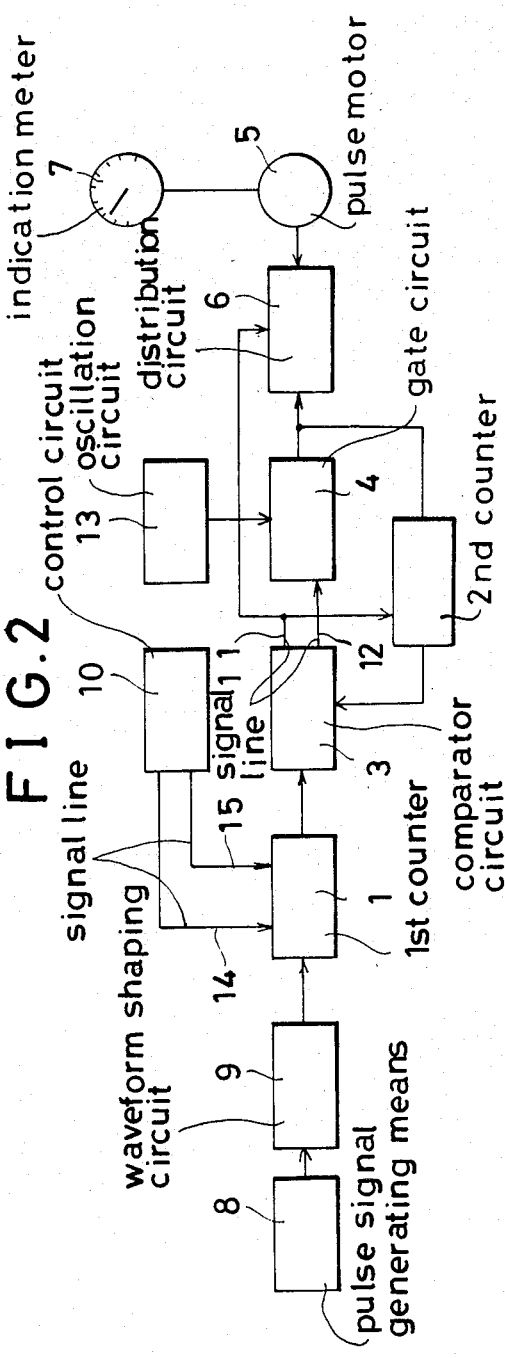
FIG. 2 is a schematic diagram of a speed meter system according to the present invention.

Referring to FIG. 2, a first counter 1 counts for a predetermined period of time, the number of pulses of a pulse signal corresponding to a vehicle speed or an engine speed. A comparator circuit 3 compares a counted value of the first counter 1 and a counted value of a second counter 2 and generates a first judgement signal indicating if the count of counter 1 is larger or smaller than the count of counter 2 and a second judgement signal indicative of equality or inequality of the two counted values. A gate circuit is opened when there is any difference between the counted value of the first counter 1 and the counted value of the second counter 2. The second counter 2 is so arranged that a standard pulse signal is added to or subtracted from a previously held counted value in counter 2 according to the first judgement signal of the comparator circuit 3 when gate circuit 4 is open. Thereby, the counted value of counter 2 is changed step by step until the resultant counted value becomes equal to the counted value of the first counter 1. A distribution circuit distributes a standard pulse signal inputted thereto through the gate circuit 4, in sequence, to plural poles of a pulse motor 5 in a positive direction or a negative direction according to the first judgement signal of the comparator circuit 3. An indication meter 7 is coupled to the pulse motor 5 as a driving source thereof so that a pointer thereof may be turned in either direction by a regular turning or a reverse turning of the pulse motor 5 for indicating the vehicle speed or the engine speed.

A pulse signal generating means 8 generates a pulse signal corresponding to a vehicle speed or to an engine speed. In the former case, the generation of the pulse signal is effected by plural magnetic poles of mutually opposite polarities being disposed alternately on the peripheral surface of a wheel axle of a vehicle, and a hall element is provided near the rotary plural magnetic poles so that a change of the magnetic field may be converted into a pulse signal by the hall element. In the latter case, the generation of the pulse signal is effected by utilizing a high voltage pulse of an ignition coil used for burning a fuel mixture in an engine, for instance. A waveform shaping circuit 9 shapes the pulse signal generated at the pulse signal generating means 8.

A control circuit 10, having a standard oscillation circuit, generates a count starting signal and a count ending signal so that a desired counting period of time for the first counter 1 may be determined by these two signals.

Thus, the first counter 1 counts the number of pulses of the foregoing pulse signal for a predetermined period of time and transmits the counted value thereof to the comparator circuit 3.

The comparator circuit 3 compares the counted value of the first counter 1 and the counted value of the second counter 2 and generates both a first judgement signal indicative of whether the count in the first counter is larger than or smaller than the count in the second counter and a second judgement signal indicative of equality or inequality of the two. The first judgement signal is set so that it will appear on a signal line 11 as a signal of "H" (High) level when the counted value of the first counter 1 is larger than the counted value of the second counter 2, and that the same may appear thereon as a signal of "L" (Low) level when smaller.

In the case where the two counted values are equal, the first judgement signal may be set to be either "H" or "L". The second judgement signal of the equality or inequality is set so that the signal line 12 is a signal of "L" when the two are equal and is a signal of "H" when the two are not equal.

The gate circuit 4 is opened by the signal "H" appearing on the signal line 12 of the comparator circuit 3 when there is a value difference between the two counted values, and permits, during that period of time, pulses of a standard pulse signal generated continuously at an oscillation circuit 13 for driving the pulse motor 5 to pass therethrough in order that the pulses of the standard pulse signal may be applied to the distribution circuit 6 and second counter 2. On the other hand, when the gate circuit 4 is closed by the signal "L" appearing on the signal line 12 because the counted values are equal, the inputting of the standard pulse signal to the distribution circuit 6 and the second counter 2 is stopped.

The second counter 2 comprises an up-down counter, and always has the first judgement signal from the comparator circuit 3 applied thereto. The counter 2 adds to or subtracts from its previously held counted value the number of pulses of the standard pulse signal applied thereto. Thus, when the signal appearing on the signal line 11 of the comparator circuit 3 is "H", the previously held counted value of the second counter 2 is increased one by one and when, in reverse, the same is "L", it is decreased one by one each time a standard pulse signal is applied thereto through the gate circuit 4. When the counted values of the first counter 1 and the second counter 2 become equal, the gate circuit 4 is closed by the signal "L" appearing on the signal line 12 of the comparator circuit 3, thus, the standard pulse signal from the oscillation circuit 13 cannot be applied to the second counter 2 and consequently the counting operation of the counter 2 is stopped. The second counter 2 is provided with a CR circuit which functions as a reset circuit (not shown) for changing the previously held counted value of the second counter 2 to zero when a power source is applied thereto so that the counting operation of the second counter 2 always starts with zero at the time of starting of the vehicle and also the operation of the indication meter 7 always starts at the zero point thereof.

The distribution circuit 6 always has the first judgement signal from the comparator circuit 3 applied thereto, and distributes each standard pulse signal so as to effect a regular turning or a reverse turning to the pulse motor according to the signal "H" or "L". When the signal appearing on the signal line 11 of the comparator circuit 3 is "H", each time the standard pulse signal is applied to the distribution circuit 6 through the gate circuit 4, plural standard pulses thereof are distributed one by one in sequence to the plural poles of the pulse motor 5 in a direction that the pulse motor 5 is turned in the regular direction, and when it is "L", the standard signal is distributed in sequence in a direction that the pulse motor 5 is turned in the reverse direction.

The pointer of the indication meter 7 is turned in conjunction with the turning of the pulse motor 5 and points to a value corresponding the present vehicle speed or engine speed.

Next, the operation of this invention speed meter system will be explained as follows:

If the engine is driven and the wheel axle is rotated, and the vehicle starts to move, a pulse signal corresponding to the engine speed or the vehicle speed is generated at the pulse signal generating means 8 and is applied to the first counter 1 after being shaped by the waveform shaping circuit 9. The first counter 1 receives the count starting signal through the signal line 14 from the control circuit 10, and starts counting of the number of pulses in the pulse signal after the previously counted value thereof is cleared. The first counter 1 continues to count the pulse signal for a predetermined period of time until it receives the count ending signal through the signal line 15 from the control circuit 10, and on receiving the count ending signal, the counter 1 applies the counted value to the comparator 3. If, now, the number of pulses corresponding to the engine speed or the vehicle speed counted during the first period of time by the first counter is assumed to be M, since the counted value held by the second counter 2 at this time is zero, the counted value M of the first counter 1 is larger than the previously held counted value "zero" of the second counter 2, and as a result the signal "H" is on the signal line 11 for the first judgement signal of the comparator circuit 3, and also the signal "H" is on the signal line 12 for the second judgement signal of the equality or inequality of the two. Thus, the first pulse of the standard pulse signal from the oscillation circuit 13 passes through the gate circuit 4 and is applied to the second counter 2 to add one to the previously held counted value of zero, and at the same time is applied to the distribution circuit 6 so as to move the pointer of the indication meter 7 by one step in the regular direction. The above stepping operation is continued by applying each pulse of the standard pulse signal to the second counter 2 and to the distribution circuit 6 so long as the signal "H" is on the signal line 12 of the comparator circuit 3. When the number of pulses of the standard pulse signal entering the second counter 2 becomes M which is equal to the counter value M of the first counter, the signal "L" appears on the signal line 12 of the comparator circuit 3, and the gate circuit 4 is closed to prevent the standard pulse signal from being applied to the second counter 2 and the distribution circuit 6. At this time, the second counter 2 holds the value M equal to the counted value M of the first counter 1, and the distribution circuit 6 stops distributing of the pulses of the standard pulse signal to the poles of the pulse motor 5, and also the pointer of the indication meter 7 which was being moved step by step in the positive direction is stopped and at the stopped position points to a value corresponding to the pulse number M.

Thus, the indication meter 7 is stopped to indicate a value corresponding to the engine speed or vehicle speed counted for the first period of time and as a result, a signal indicating that the counted values of the two counters 1 and 2 are equal, is generated from the comparator circuit 3, and thereby, the gate circuit 4 is closed to prevent the standard pulse signal from being applied to the second counter 2 and the distribution circuit 6.

If thereafter, the counter starting signal is generated again from the control circuit 10, the previously counted value M of the first counter 1 is cleared by this signal, and the first counter 1 starts to count the number of pulses of the pulse signal corresponding to the new engine speed or vehicle speed. This counting is continued until the first counter receives again the counter ending signal from the control circuit 10. Thus, the counting for the second predetermined period of time is ended, and in this case, the counted value of the first counter 1 is assumed to be N (N<M), the first judgement signal of the comparator circuit 3 becomes "L", and the second judgement signal of equality or inequality becomes "H", so that the gate circuit 4 is opened again, and the standard pulse signal from the oscillation circuit 13 is applied to the second counter 2 and the distribution circuit 6.

The second counter 2 operates such that the previously held counted value M thereof is subtracted by one at each time when a pulse of the standard pulse signal is applied thereto, and this substraction operation is continued until the previously held counted value thereof becomes equal to the counted value N of the first counter 1. At the same time, the distribution circuit 6 distributes each standard pulse signal step by step in the negative direction until the previously counted value M becomes the counted value N.

If, thus, the resultant counted value of the second counter 2 becomes N, the second judgement signal of equality or inequality of the comparator circuit 3 becomes "L", and the gate circuit 4 is closed, and consequently the second counter 2 holds the pulse number N, and the pointer of the indication meter 7 is turned in the negative direction and is stopped at the position indicating a value corresponding to the new engine speed or vehicle speed.

Thereafter, the step operation is repeated during driving of the vehicle, and thereby the indication meter 7 is operated in response to any change in the vehicle speed or engine speed.

Thus, according to this invention, the output of the comparator circuit 3 comparing the counted value of the first counter 1 and the counted value of the second counter 2 is composed of two kinds of signals, that is, a first judgement signal indicative of whether the count of the first counter is larger or smaller than the count of the second counter and a second judgement signal of equality or inequality of the two values, so that the output of the comparator circuit can be transmitted to a subsequent stage circuit by two signal lines, and thus the connection circuit therebetween can be constructed simply, ecconomically and with good reliability.

Additionally, according to this invention, the previously held counted value of the second counter 2 is added to or subtracted from by the pulses of the standard pulse signal until the count becomes equal to the counted value of the first counter 1, so that even if there is an error in counting in the counted value of the first or second counter at each counting time, the danger that counting errors in counting are accumulated in the counter as in the foregoing conventional example is eliminated, because the previously counted value is cleared before the next counting period.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:
1. A speed meter system for a vehicle comprising:
 (a) first pulse generating means for providing pulses in accordance with the speed or engine speed of a vehicle;
 (b) first counter means, coupled to said first pulse generating means, for counting the number of pulses generated by said pulse generating means;
 (c) second counter means;
 (d) comparator means, coupled to said first and second counter means, for comparing the counts therein, said comparator means producing a first judgement signal indicative of whether the count of the first counter means is larger than or smaller than the count of the second counter means and a second judgement signal indicative of the equality or inequality of the counts in said first and second counters;
 (e) gate circuit means coupled to said comparator means for receiving said second judgement signal therefrom, said gate means being opened when said second judgement signal indicates an inequality and closed when said second judgement signal indicates equality;
 (f) second pulse generator means coupled to said second counter means through said gate circuit means for applying pulses to said second counter means when said gate circuit means is open, thereby changing the count in said second counter means; and
 (g) output means coupled to said second pulse generator means through said gate circuit means for providing an output indicative of the speed of the vehicle or engine thereof in accordance with the output of said second pulse generator means.

2. A speed meter system as set forth in claim 1, wherein said second counter means is an up-down counter and wherein said first judgement signal is applied thereto to determine whether the pulses from said second pulse generator means are added to or subtracted from the count in said second counter means.

3. A speed meter system as set forth in claims 1 or 2, wherein said output means comprises a distribution means having a control input coupled to said comparator means for receiving said first judgement signal therefrom, pulse motor means coupled to said distribution means, wherein said distribution means controls the direction of rotation of said pulse motor means in accordance with said first judgement signal, and indicator means coupled to said motor means for providing an output in accordance with the output of said motor means.

4. A speed meter circuit as set forth in claims 1 or 2, wherein said second counter means includes a reset means for resetting the count therein to zero.

* * * * *